(12) United States Patent
Van Druff et al.

(10) Patent No.: US 6,367,882 B1
(45) Date of Patent: Apr. 9, 2002

(54) SLIP-RETARDING UPPER TORSO RESTRAINT HARNESS AND SYSTEM

(75) Inventors: Charles E. Van Druff, Lake Forest; Michael A. Duran, Buena Park, both of CA (US)

(73) Assignee: H. Koch & Sons Co., Inc., Anaheim, CA (US)

(*) Notice: Subject to any disclaimer, the term of this patent is extended or adjusted under 35 U.S.C. 154(b) by 0 days.

(21) Appl. No.: 09/514,874

(22) Filed: Feb. 28, 2000

(51) Int. Cl.⁷ .............................................. B60R 21/00
(52) U.S. Cl. ........................................ 297/484; 297/467
(58) Field of Search ................................. 297/484, 464, 297/467, 474, 216.1, 217.1; 244/122 B; 280/808; 2/460

(56) References Cited

U.S. PATENT DOCUMENTS

| | | | |
|---|---|---|---|
| 3,191,599 A | * | 6/1965 | Kendell |
| 3,306,662 A | * | 2/1967 | Finnigan |
| 4,175,787 A | * | 11/1979 | Muskat |
| 4,302,049 A | * | 11/1981 | Simpson |
| 4,488,691 A | * | 12/1984 | Lorch |
| 4,854,608 A | * | 8/1989 | Barral |
| 4,879,768 A | * | 11/1989 | McClees et al. |
| 5,398,997 A | * | 3/1995 | McFalls |
| 5,540,403 A | * | 7/1996 | Standley |
| 6,179,329 B1 | * | 1/2001 | Bradley |

\* cited by examiner

*Primary Examiner*—Milton Nelson, Jr.

(57) ABSTRACT

A slip-retarding upper torso restraint harness and system for supporting a pilot seated in a vehicle during crash impact. The restraint harness includes a pair of retractably anchored left and right shoulder webbings each having a friction area on its respective inner surface, and at least one anchored base webbing releasably connectable to the pair of left and right shoulder webbings by a buckle. The friction areas operate to prevent the pilot from sliding forward along the inner surfaces of the left and right shoulder webbings during crash impact. Additionally, the restraint system further includes a one-piece pilot suit having secondary friction areas which work together with the friction areas of the restraint harness to provide even greater restraint during crash impact.

9 Claims, 5 Drawing Sheets

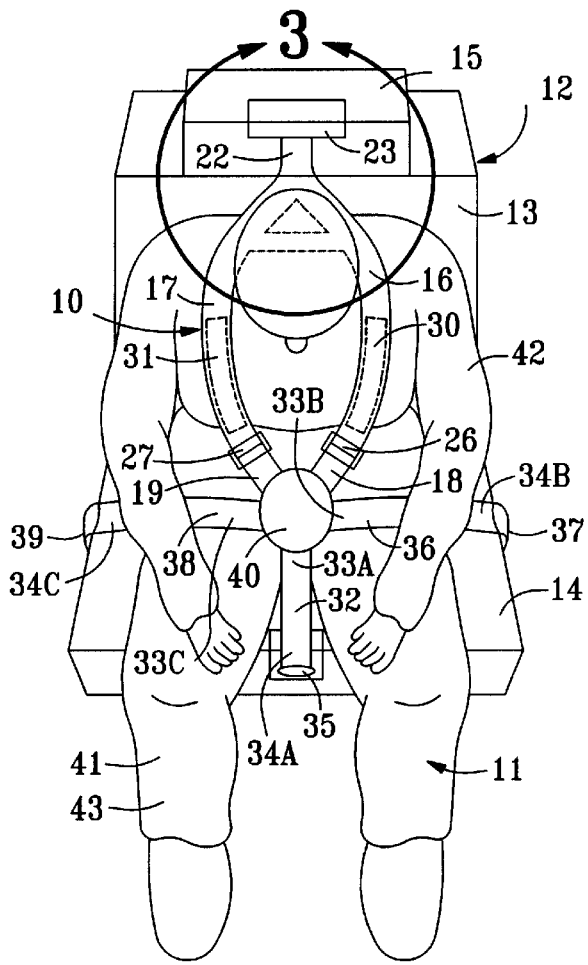
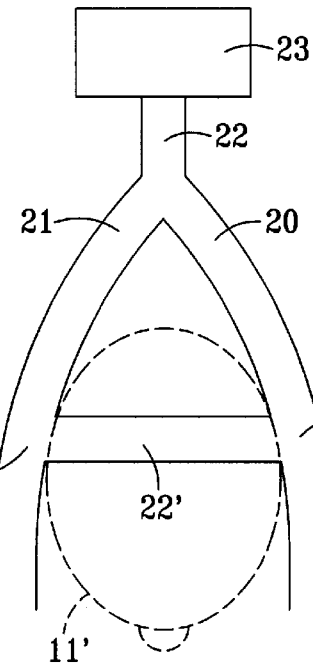
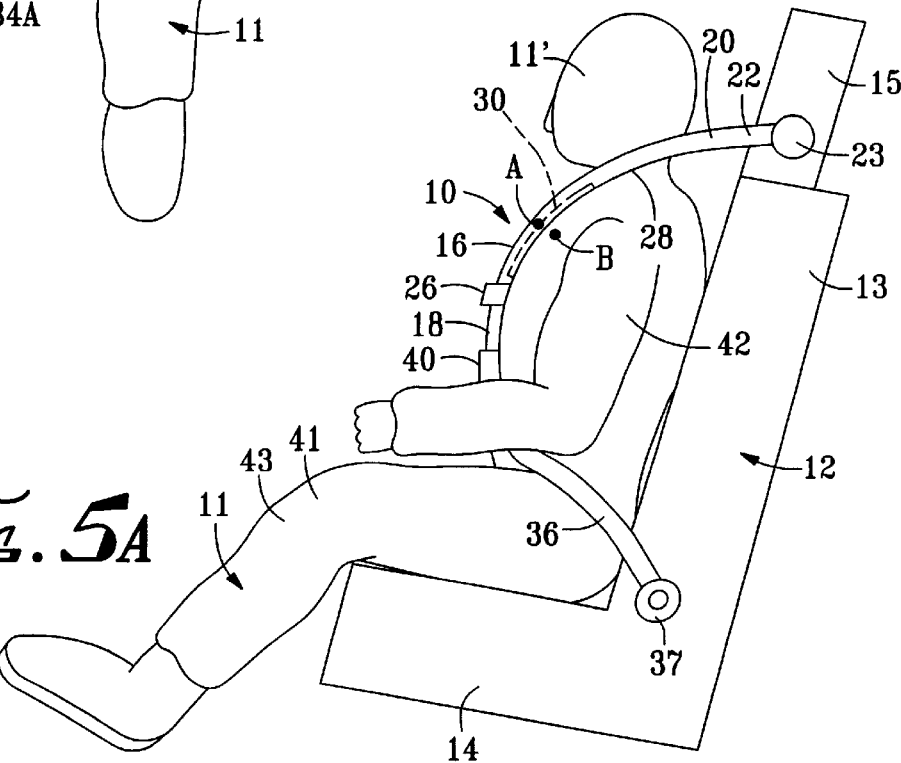

DECELERATION IMPACT FORCE F @ TIME $t_1$

DECELERATION IMPACT FORCE F @ TIME $t_1$

SLIP-RETARDING UPPER TORSO RESTRAINT HARNESS AND SYSTEM

BACKGROUND OF THE INVENTION

The field of the invention generally pertains to restraint and safety harnesses, and more particularly to a slip-retarding upper torso restraint harness and system for supporting a pilot of an aircraft or land vehicle during sudden dynamic load conditions typically associated with a crash impact.

Various types of safety harness and restraint systems have been developed and used in aircraft and land-based vehicles to protect pilots and drivers alike in a crash. In particular, four, five, or six-point anchor systems featuring a pair of shoulder webbings have been commonly used in such heavy-duty applications as military aircraft and racing cars. Typically, the shoulder webbings extend down over the shoulders of an occupant from one or two anchor points behind the head of the occupant, and connect directly or indirectly with a lap webbing anchored to side anchors.

One example of a vehicle safety belt system is shown in U.S. Pat. No. 4,175,787 having a single, continuous length of seat belt webbing forming a pair of shoulder belt portions secured at an upper area of a seat backrest. The shoulder belt portions are passed down and through side anchors located at the bottom of a seat on opposite sides of an occupant, and redirected as lap belt portions around the lap of the occupant. The lap and shoulder belt portions are interconnected above the side anchors by guide members sewn to the lap belt portions.

Similar to patent '787, a combined shoulder harness and lap belt restraint apparatus is disclosed in U.S. Pat. No. 4,231,616. The apparatus has first and second lap belt portions secured to side anchors located at the bottom of a seat on opposite sides of an occupant. Additionally, first and second shoulder straps extending over the occupants shoulders from a head anchor point are passed down and through the side anchors and affixed to the respective lap belt portions at intermediate points thereon. In this manner, the lap belt and shoulder straps can be simultaneously tightened or released by a single fasten/release point, which greatly conveniences and facilitates the strap-down securing process.

In U.S. Pat. No. 5,524,928 an automobile restraint system is disclosed having a pair of shoulder webs extending over the shoulders of a passenger from behind the seat to connect with a central web anchored at the forward edge of the seat. A pair of retaining webs intersect the respective left the right shoulder webs and extend outwardly to side anchors located on opposite sides of the passenger. During deceleration, the system engages the upper inside portions of the thighs and the shoulders of the passenger, thereby preventing contact of the webs with the neck, chest, or central torso portions of the passenger.

And finally, in U.S. Pat. No. 4,854,608 a torso restraint is shown utilizing a central buckle to releasably secure two lap belts with two shoulder straps which extend over the shoulders of an occupant from a rear anchor point. The two shoulder straps resiliently elongate asymmetrically during an impact and permit the rotation of the torso and a subsequent forward displacement of one shoulder relative to the other shoulder. However, while functioning to absorb and dissipate kinetic energy, any movement of the upper torso during a crash can pose a risk to the pilot by increasing the chances of coming into contact with an interior surface of a vehicle.

While the devices disclosed in patents '787, '616, '928, and '608 each achieve their respective objectives of restraining an occupant of a vehicle during a crash impact, they do not adequately address the unique problems associated with aircraft crashes, particularly helicopter crashes. One particular problem often seen in helicopter crashes is slippage of the upper torso beneath, and relative to, the shoulder webbings. Upper torso slippage can occur in helicopter crashes due to a combination forward inertial displacement and lumbar compression of the upper torso.

Lumbar compression is the axial compression of the spine which can cause sudden slack in the shoulder webbings. Lumbar compression can result because of the steep descent and impact angles of helicopters while remaining generally level. When the spine compresses, the upper torso can continue to move forward for a momentary duration after the shoulder webbings have locked into place. Consequently, a second impact can take place between the pilot and the restraint harness which can greatly magnify the severity of the injury as compared to injury from the initial crash impact alone. This can occur even when the restraint harness is snugly secured on the pilot during regular operation.

Moreover, upper torso slippage and movement can be especially fatal in helicopter crashes because of the close proximity of the flight control stick to the upper torso of the pilot. While both airplane and helicopter are controlled and operated by means of flight control sticks, helicopter control sticks typically extend up from between the pilot's legs a greater distance than do most airplane control sticks, and can pose a greater risk in the event of a crash. Thus, there is a need to further reduce upper torso slippage and movement during a crash, particularly a helicopter crash, in order to prevent possible greater injury to the upper torso, and thereby improve crash survivability.

BRIEF SUMMARY OF THE INVENTION

It is an object of the present invention to provide a slip-retarding upper torso restraint harness having a pair of shoulder webbings which minimize the slippage experienced by the upper torso of a pilot of a vehicle along inner surfaces of the shoulder webbings during a crash impact.

It is a further object of the present invention to provide a slip-retarding upper torso restraint system utilizing the slip-retarding upper torso restraint described above, together with a friction-inducing one-piece pilot suit to further prevent slippage along the inner surfaces of the shoulder webbings during a crash impact.

The present invention is for a slip-retarding upper torso restraint harness and system for use with a seat in a vehicle, for supporting a pilot of the vehicle during sudden dynamic load conditions associated with a crash impact. The restraint harness is capable of being positioned over the respective left and right shoulders of the pilot, and comprises elongated left and right shoulder webbings each having first and second ends, and inner and outer surfaces. Each of the second ends are retractably secured by retractor means to a stationary structure on the vehicle near an upper portion of the seat. And each of the inner surfaces have a friction area affixed to the respective inner surface. The restraint harness also includes at least one elongated base webbing having a coupling end and an anchor end secured to a lower portion of the seat, and means for releasably securing together the first ends of the elongated left and right shoulder webbings and the coupling end of the elongated base webbing. In this manner, the friction areas of the elongated left and right shoulder webbings function to minimize upper torso slippage along the inner surfaces of the elongated left and right shoulder webbings when sudden dynamic load conditions are experienced during a crash impact. Additionally, the slip-retarding upper torso restraint system further includes a one-piece pilot suit, preferably having secondary friction areas, utilized in combination with the slip-retarding upper torso restraint harness to provide even greater slip-friction during crash impact.

BRIEF DESCRIPTION OF THE DRAWINGS

FIG. 2 is a top view of the slip-retarding upper torso harness and system of FIG. 1.

FIG. 3 is an enlarged view taken along the circle 3 of FIG. 2 detailing the generally inverted Y-configuration of the second ends joined together.

FIG. 5A is a dynamic side view of the slip-retarding upper torso harness and system prior to crash impact.

DETAILED DESCRIPTION OF THE PREFERRED EMBODIMENTS

Figure 1:
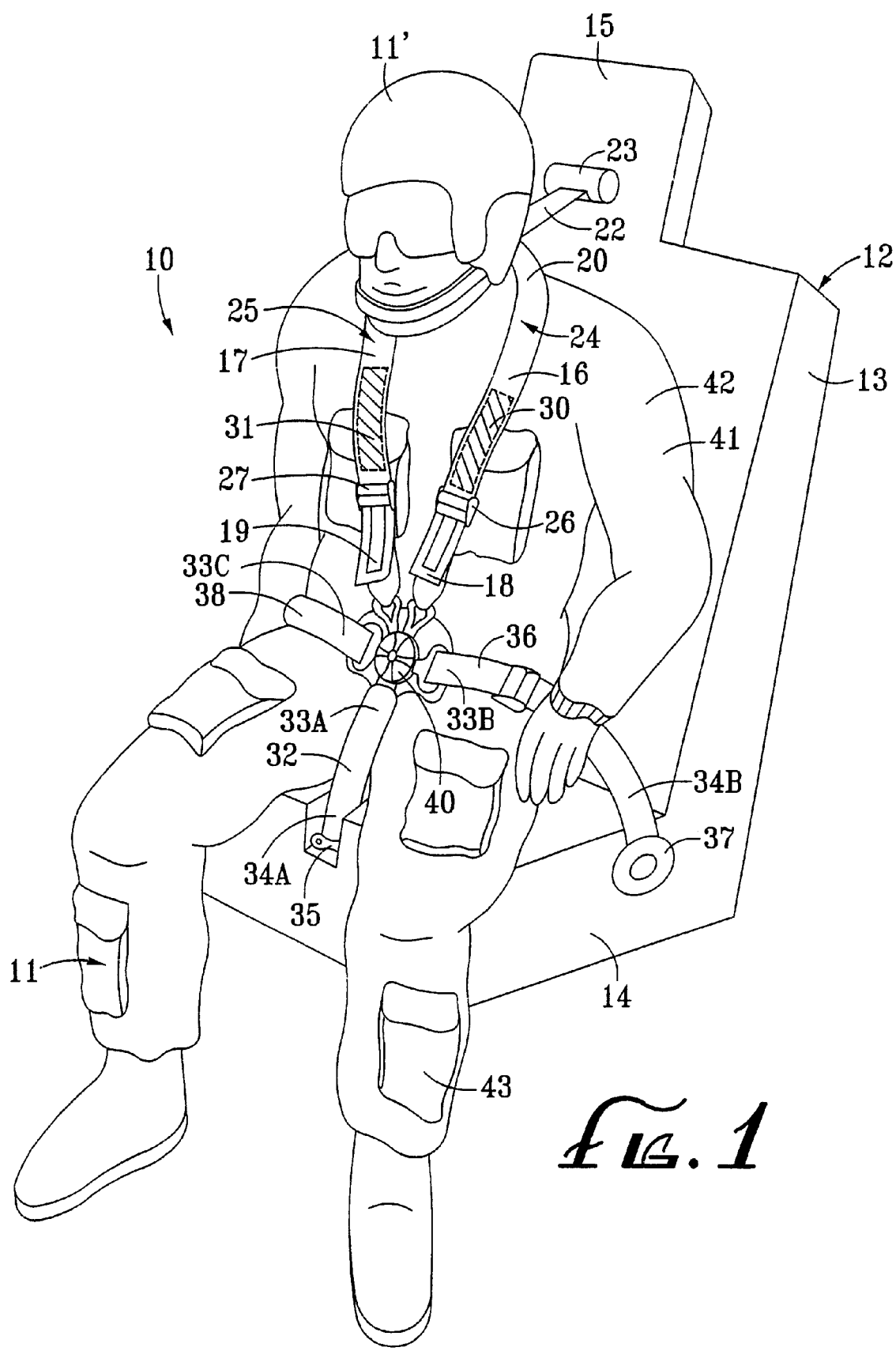
FIG. 1 is a perspective view of the slip-retarding upper torso harness and system securely positioned to restrain a pilot seated in a vehicle.

Referring now to the drawings, FIGS. 1 and 2 show the slip-retarding upper torso harness, generally indicated at reference character 10. The slip-retarding upper torso harness 10 is shown securely positioned to restrain a pilot, generally indicated at reference character 11, supported on a seat, generally indicated at reference character 12, in a vehicle (not shown). As shown in FIG. 1, the pilot 11 is preferably a pilot of aircraft, including airplanes and helicopters, although it is not limited thereto. In this regard, the seat 12 is designed and secured to the aircraft in a manner sufficient to bear loads typically associated with the particular aircraft and/or application. As can be seen in FIGS. 1 and 2, the seat 12 has a base portion 14 supporting the bulk of the pilot's weight, and a backrest portion 13 rigidly attached to the base portion 14. Further, a headrest portion 15 is separately or integrally joined to the backrest portion 13 to provide support to the pilot's head 11'.

As shown in FIGS. 1–4 the slip-retarding upper torso restraint harness 10 has elongated left and right shoulder webbings, 16, 17, respectively, which directly contact and support the upper torso of the pilot 11 along the pilot's chest. The elongated left and right shoulder webbings 16, 17 have first ends 18, 19, second ends 20, 21 (see FIGS. 3, 4), outer surfaces 24, 25 (see FIGS. 1, 4), and inner surfaces 28, 29 (see FIGS. 1, 4), respectively. Moreover, and preferably, the left and right shoulder webbings 16, 17 have length adjustment devices 26, 27, respectively, for suitably lengthening or shortening the respective shoulder webbing 16, 17 to accommodate various size pilots 11.

Figure 4:
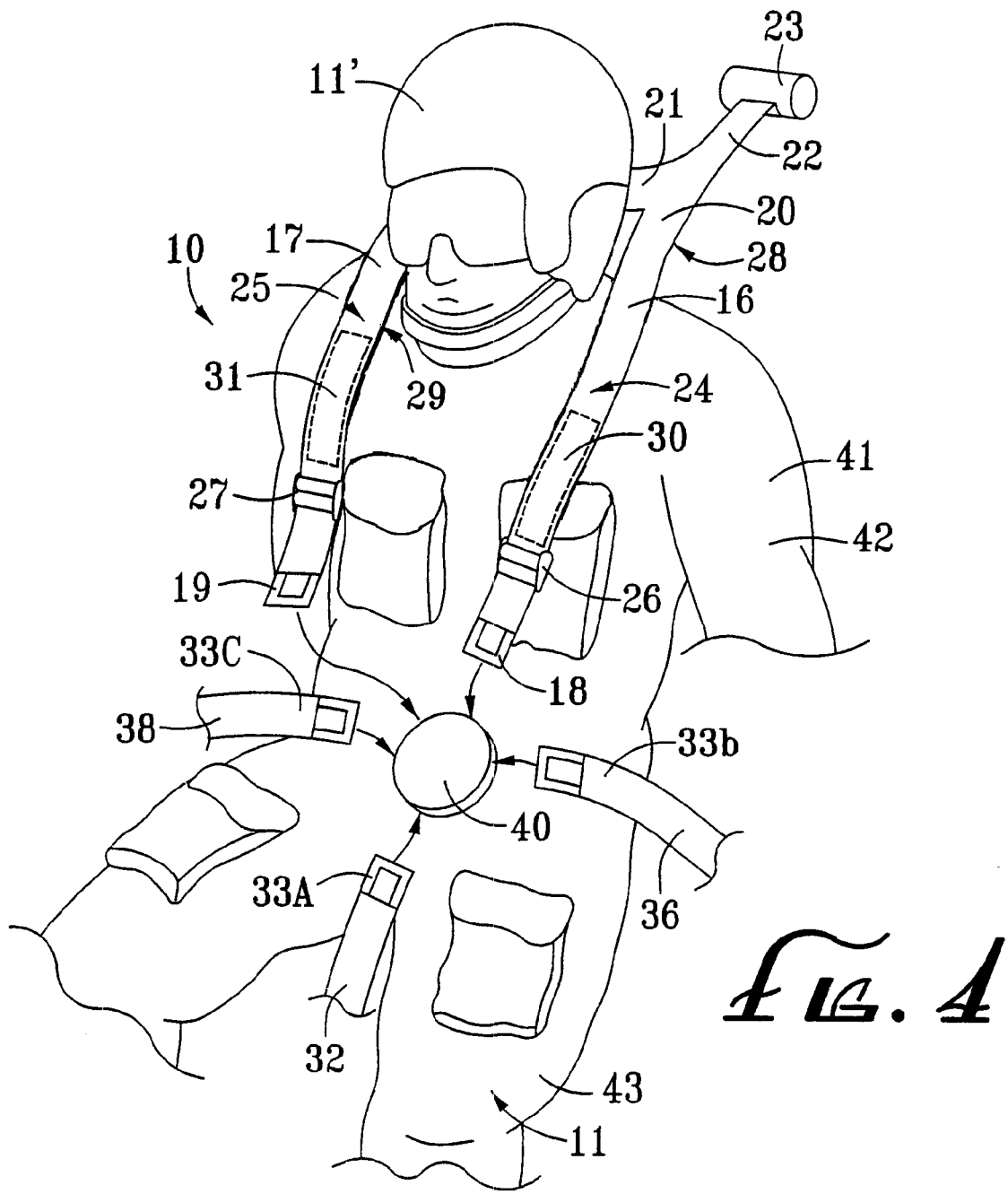
FIG. 4 is an exploded perspective view of the upper torso restraint harness relative to the pilot.

As can be best seen in FIGS. 1, 2 and 4, the inner surfaces 28, 29 of the shoulder webbings 16, 17 have primary friction areas 30, 31, respectively, affixed to them by suitable means. In a first preferred embodiment, these primary friction areas 30, 31 function to induce slip-friction by directly contacting a pilot suit 41 worn by the pilot 11. The friction-inducing properties of the primary 30, 31 friction areas are due to their high coefficients of friction. To this effect, the primary friction areas 30, 31 are preferably pads made of a suitable elastomeric material, such as a rubber compound. While a rubber pad may be sewed or otherwise secured to the inner surfaces 28, 29 of the shoulder webbings 16, 17, it is also contemplated that the elastomeric material be applied by a coating process. The pilot suit 41 is preferably a one-piece suit having pants 43 and shirt 42 portions integrally joined to prevent separation, thereby maximizing the effect of the slip-friction contact.

As can be best seen in FIGS. 2–4, the second ends 20, 21 are retractably secured to a stationary structure 15 on the aircraft near an upper portion of the seat 12 by retractor means 23. The stationary structure 15 is preferably the headrest 15, but is not limited only to such. The retractor means 23 has a suitable recoil mechanism known in the relevant art which prevents excess play in the shoulder webbings 16, 17, and maintains a comfortable tension in the shoulder webbings 16, 17. Preferably, the retractor means 23 is an inertial type retractor means which is activated by changes in velocity detected by an accelerometer device. And preferably still, the retractor means 23 is itself secured to the stationary structure 15 at a rearward location of the pilot 11, typically behind the pilot's head 11'.

As can be best seen in FIGS. 2 and 3, the second ends 20, 21 are preferably joined together in a generally inverted Y-configuration with a single retractor webbing 22, which is in turn retractably connected to the retractor means 23. Additionally, the second ends 20, 21 of the shoulder webbings 16, 17 are transversely connected by a transverse webbing 22' typically having a length equal to the separation distance between the left and right shoulder webbings 16, 17. The transverse webbing 22' preferably rests on a back portion of the pilot's neck and can be used to correctly and more comfortably position the shoulder webbings 16, 17 around the neck and over the shoulders of the pilot 11.

Additionally, the slip-retarding restraint harness 10 has at least one elongated base webbing (32, 36, and 38 in FIGS. 1, 2, and 4) each having a coupling end (33a, 33b, and 33c in FIGS. 1, is 2, and 4), and an anchor end (34a, 34b, and 34c in FIGS. 1 and 2) for securing the lower body and mid-section areas of the pilot 11. In a preferred embodiment, as can be best seen in FIGS. 1, 2, and 4, the restraint harness 10 preferably has three elongated base webbings 32, 36, 38 including left and right lap webbings 36, 38, respectively, and a central webbing 32. The left and It right webbings 36, 38 function to restrain movement of the lower body and mid-section of the pilot 11 during a crash. The anchor ends 34b, 34c of the left and right lap webbings 36, 38 connect to left and right anchor point 37, 39, respectively, which are preferably positioned on the base portion 14 of the seat 12 on opposite sides of the pilot 11. Additionally, the anchor end 34a of the central webbing 32 connects to a central anchor point 35, typically on the base portion 14 of the seat 12.

Finally, as can be best seen in FIGS. 1, 2, and 4, the slip-retarding restraint harness 10 has means for releasably securing together 40 the first ends 18, 19 of the shoulder webbings 16, 17 and the coupling ends 33a, 33b, 33c of the base webbings 32, 36, 38, respectively. The means for releasably securing 40 is preferably a latch-connector type buckle having a number of connector points equal to the total number of first ends 18, 19 and coupling ends 33a, 33b, 33c.

In FIG. 5A, a dynamic side view of the slip-retarding upper torso harness is shown prior to crash impact. In particular, FIG. 5A illustrates the primary friction area 30 on the inner surface 28 in contact with the front upper torso, i.e. chest area, of the pilot 11. While not shown in FIG. 5A, the primary friction area 31 on the inner surface 29 similarly comes into contact with the front upper torso of the pilot 11. Reference point A depicts a first reference point on the primary friction area 30, and reference point B depicts a second reference point on the pilot suit 41 immediately adjacent reference point A.

Figure 5B:
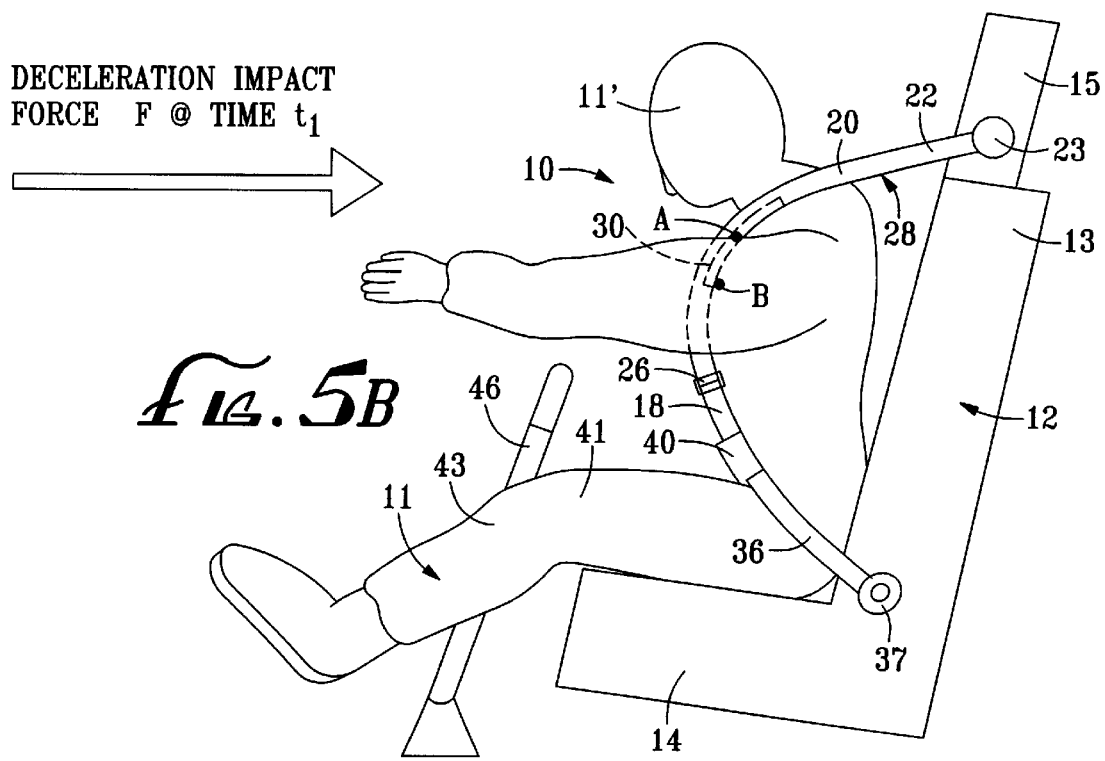
FIG. 5B is a dynamic side view of the slip-retarding upper torso harness of FIG. 5A during crash impact.

FIG. 5B shows a dynamic side view of the slip-retarding is upper torso harness of FIG. 2A during crash impact following the view shown in FIG. 5A. As can be seen in FIG. 5B, the upper torso of the pilot 11 exhibits lumbar compression of the spine, particularly in a helicopter crash, which causes the upper torso to be lowered substantially from its original position. However, tangential slippage along the inner surface is minimized due to the friction-inducing characteristics of the primary friction areas 30, 31. Moreover, because the forward movement of the upper torso during impact increases the normal force between the inner surfaces 28, 29 and the upper torso, this causes the frictional force to increase proportionately, thereby creating an even greater slip-retarding effect. Thus the range of motion of the pilot 11 is limited, and the pilot 11 is kept from striking an interior surface of the vehicle such as a control stick 46 positioned between the legs of the pilot 11, commonly found in aircraft such as military airplanes and helicopters. This is especially beneficial in helicopters where the control stick 46 typically extends higher between the pilot's 11 legs and into the pilot's 11 lap, than other types of aircraft.

Figure 5C:
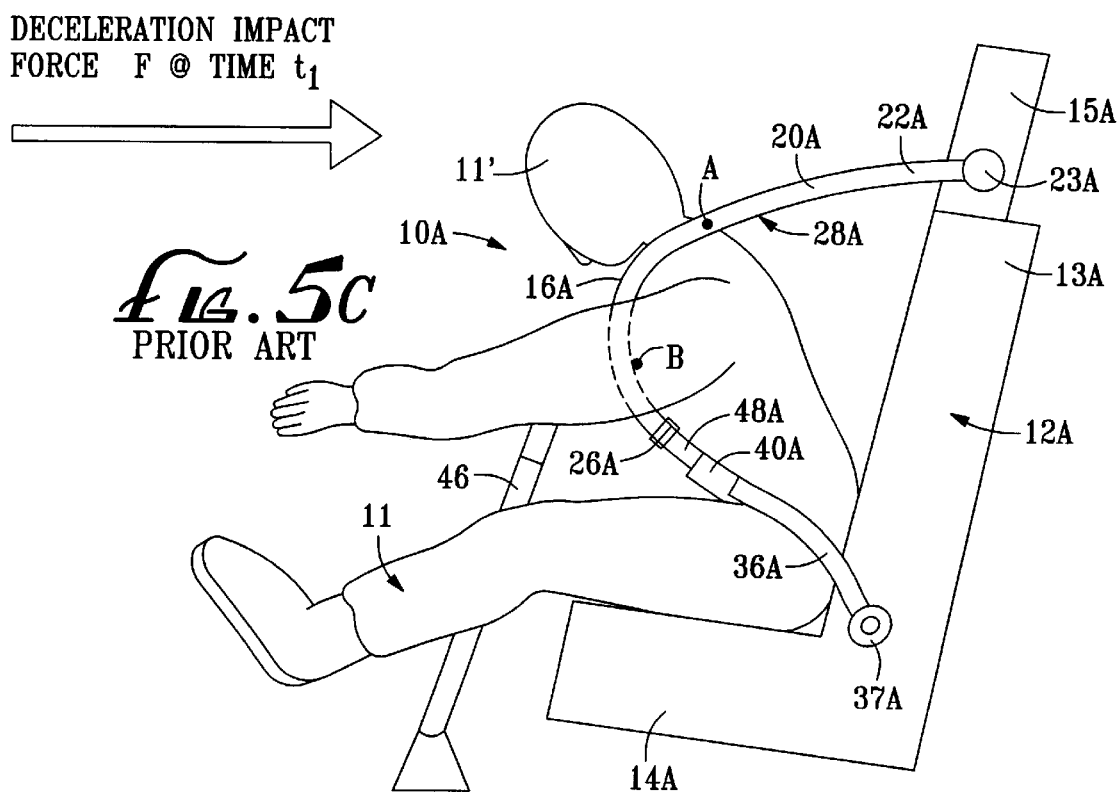
FIG. 5C is a dynamic side view of a prior art upper torso harness during crash impact, analogous to FIG. 5B.

As a comparative illustration, FIG. 5C shows a dynamic side view of a prior art upper torso harness 10A during a crash impact analogous to FIG. 5B. Because the pilot suit 11 is allowed to directly contact the inner surface 28A of the shoulder webbing 16A, greater slippage results between the upper torso and the inner surface 28A when the pilot's upper torso undergoes lumbar compression during impact. This is highlighted by the range of motion depicted by reference point A relative to reference point B, which is greater than that shown in FIG. 5B. Unlike the slip-retarding upper torso restraint harness 10 of the present invention, the prior art restraint harness 10A could enable sufficient movement of the pilot's 11 upper torso to contact the control stick 46.

Figure 6:
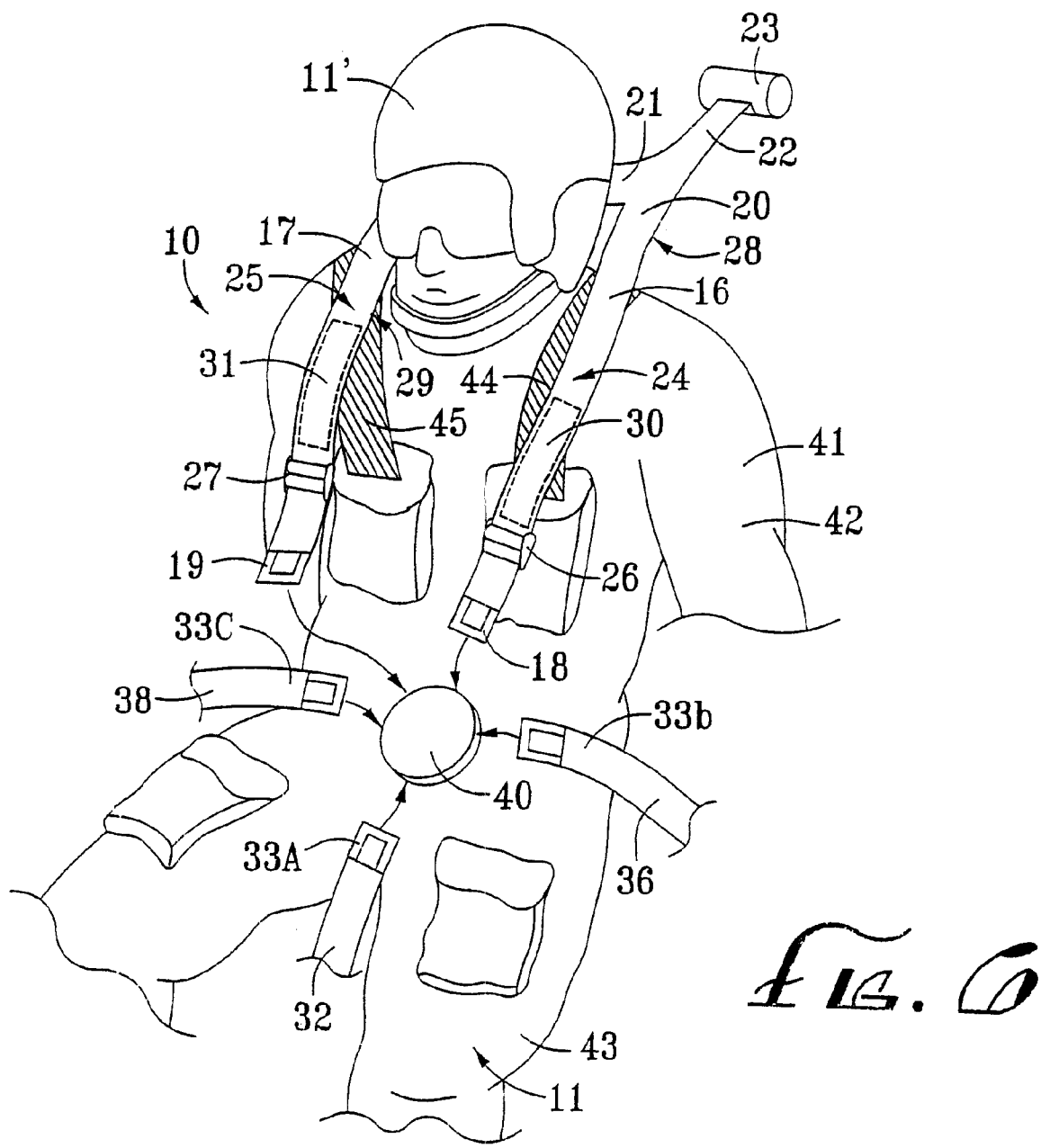
FIG. 6 is an exploded perspective view of the second preferred embodiment of the upper torso restraint harness relative to the pilot.

FIG. 6 illustrates a slip-retarding restraint system where the primary friction areas 30, 31 of the slip-retarding restraint harness 10 operate in combination with secondary friction areas 44, 45 affixed to the pilot suit 41. The secondary friction areas 44, 45 are affixed on the pilot suit 41 at locations opposite the primary friction areas 30, 31 such that the primary 30, 31 and secondary 44, 45 friction areas come into direct contact with each other when the shoulder webbings 16, 17 are secured. Similar to the primary friction areas 30, 31, the second friction areas 44, 45 are also preferably pads made of an elastomeric material, such as a rubber compound. Alternatively, both the primary 30, 31 and secondary 44, 45 friction areas are made of hook and loop material, commonly known by the trademark name "Velcro." In this manner, the slip-retarding restraint system can provide even greater slip-friction between the restraint harness 10 and the pilot suit 41, although in many applications it can unduly restrict the wearers movement.

By the term "pilot," as used herein and in the claims, it is generally intended to be broadly defined to mean any operator of a vehicle, including aircraft pilots as well as operators of automobiles and watercraft. Additionally, by the term "webbings," as used herein and in the claims, it is intended to define any flat, elongated material exhibiting outstanding strength properties with minimal elongation. Additionally, all webbings described herein and in the claims, including the left and right shoulder webbings 16, 17, base webbings, left and right lap webbings 36, 38, and central webbing 32, are preferably made of a polyester material.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A slip-retarding upper torso restraint harness for use with a seat in a vehicle, for supporting a pilot of the vehicle during dynamic load conditions associated with a crash impact, said restraint harness comprising:

elongated left and right shoulder webbings, each having a first end, a second end adapted to be retractably secured to a stationary structure on said vehicle near an upper portion of said seat by retractor means, an outer surface, and an inner surface having a friction area affixed thereon, said elongated left and right shoulder webbings capable of being positioned over the respective left and right shoulders of said pilot;

at least one elongated base webbing having a coupling end and an anchor end adapted to be secured to a lower portion of said seat; and means for releasably securing together the first ends of said elongated left and right shoulder webbings and the coupling end of said elongated base webbing, whereby the friction areas of said elongated left and right shoulder webbings are adapted to restrain said pilot from sliding forward along the respective inner surfaces of said elongated left and right shoulder webbings when dynamic load conditions are experienced during a crash impact.

2. A slip-retarding upper torso restraint harness as in claim 1, wherein the friction area is a pad made of an elastomeric material.

3. A slip-retarding upper torso restraint harness as in claim 1, wherein the respective second ends of the elongated left and right shoulder webbings are joined in a generally inverted Y-configuration at a rearward location to said pilot.

4. A slip-retarding upper torso restraint system for use with a seat in a vehicle, for supporting a pilot of the vehicle during dynamic load conditions associated with a crash impact, said restraint system comprising:

a slip-retarding upper torso restraint harness comprising:
 elongated left and right shoulder webbings, each having a first end, a second end adapted to be retractably secured to a stationary structure on said vehicle near an upper portion of said seat by retractor means, an outer surface, and an inner surface having a primary friction area affixed thereon, said elongated left and right shoulder webbings capable of being positioned over the respective left and right shoulders of said pilot;
 at least one elongated base webbing having a coupling end and an anchor end adapted to be secured to a lower portion of said seat; and means for releasably securing together the first ends of said elongated left and right shoulder webbings and the coupling end of said elongated base webbing; and a pilot suit adapted to be worn by said pilot having integral pants and shirt portions, whereby the primary friction areas are adapted to restrain said pilot from sliding forward along the respective inner surfaces of said elongated left and right shoulder webbings when dynamic load conditions are experienced during a crash impact.

5. A slip-retarding upper torso restraint system as in claim 4, wherein the primary friction areas are pads made of an elastomeric material.

6. A slip-retarding upper torso restraint system as in claim 4, wherein said pilot suit has secondary friction areas affixed thereon at points opposite the primary friction area of said upper torso restraint harness, said first and secondary friction areas having friction-inducing properties when placed in contact with each other.

7. A slip-retarding upper torso restraint system as in claim 6 wherein the primary and secondary friction areas are pads made of an elastomeric material.

8. A slip-retarding upper torso restraint system as in claim 6, wherein the primary and secondary friction areas are pads made of hook and loop material.

9. A slip-retarding :upper torso restraint system as in claim 4, wherein the respective second ends of the elongated left and right shoulder webbings are joined in a generally inverted Y-configuration at a rearward location to said pilot.

* * * * *